United States Patent [19]
Hilden et al.

[11] 3,911,949
[45] Oct. 14, 1975

[54] SAFETY FUELING VALVE

[75] Inventors: Noel W. Hilden, River Vale; Peter J. Regna, Englewood Cliffs, both of N.J.

[73] Assignee: Aero Tec Laboratories Inc., Waldwick, N.J.

[22] Filed: Dec. 3, 1973

[21] Appl. No.: 421,046

[52] U.S. Cl. .............. 137/525; 141/326; 137/592; 220/86 R; 251/118
[51] Int. Cl.² ........................................ F16K 15/00
[58] Field of Search ......... 141/326; 220/85 F, 85 R, 220/86 R, 86 AT; 137/525, 590, 592; 251/43, 118, 359

[56] References Cited
UNITED STATES PATENTS

| | | | |
|---|---|---|---|
| 1,935,329 | 11/1933 | Needham | 251/359 |
| 2,579,855 | 12/1951 | Pockel et al. | 137/525 |
| 2,655,178 | 10/1953 | Sarosdy | 137/592 |
| 2,936,779 | 5/1960 | Kindred | 137/525 |
| 3,059,637 | 10/1962 | Senne | 137/525 |
| 3,196,924 | 7/1965 | Kaminga | 137/525 |
| 3,228,418 | 1/1966 | Rosback et al. | 137/525 |
| 3,519,012 | 7/1970 | Patten | 137/525 |
| 3,730,218 | 5/1973 | Rydberg | 137/525 |

*Primary Examiner*—Martin P. Schwadron
*Assistant Examiner*—George L. Walton
*Attorney, Agent, or Firm*—Robert A. Maikis

[57] ABSTRACT

A safety fueling valve is provided for high performance vehicles, such as racing cars, for example, comprising a substantially cylindrical valve body which extends from the surface of the vehicle fuel tank to the interior of the tank. An internal vane assembly in the valve body serves to channel fuel flow within the valve and to prevent turbulence. The end of the valve body disposed within the fuel tank is provided with a valve seat which receives a substantially circular valve member of flexible resilient material. The valve member is held against the valve seat by centrally-disposed mounting means which are secured to the vane assembly, so that the valve is in a normally-closed position to prevent spillage of fuel from the vehicle tank regardless of vehicle orientation or attitude. The normal flow of fuel entering the valve body during fueling operations is sufficient to open the valve and permit entry of fuel into the tank.

3 Claims, 5 Drawing Figures

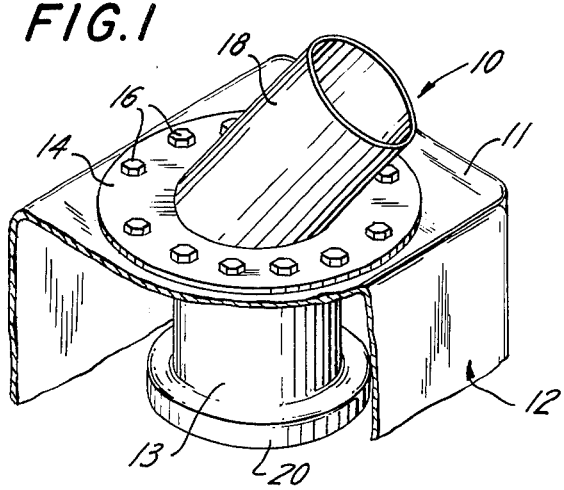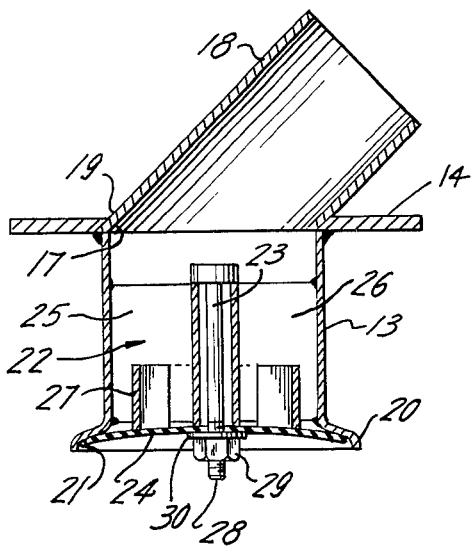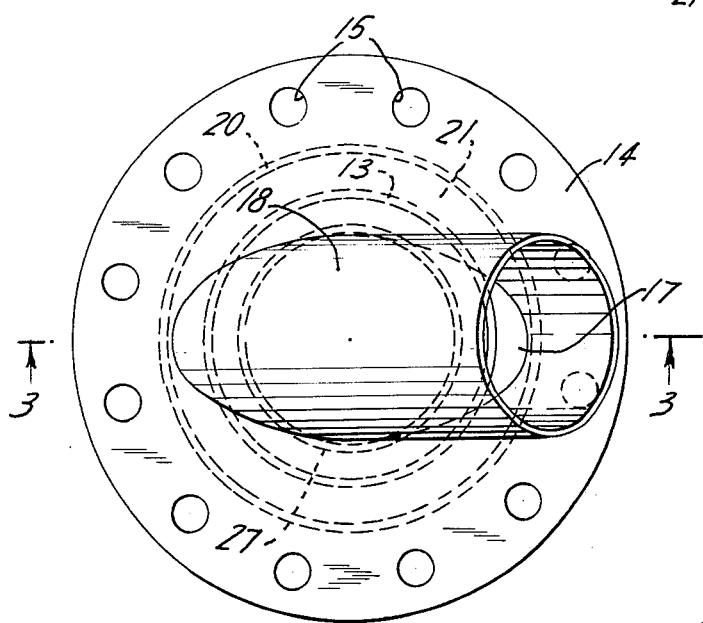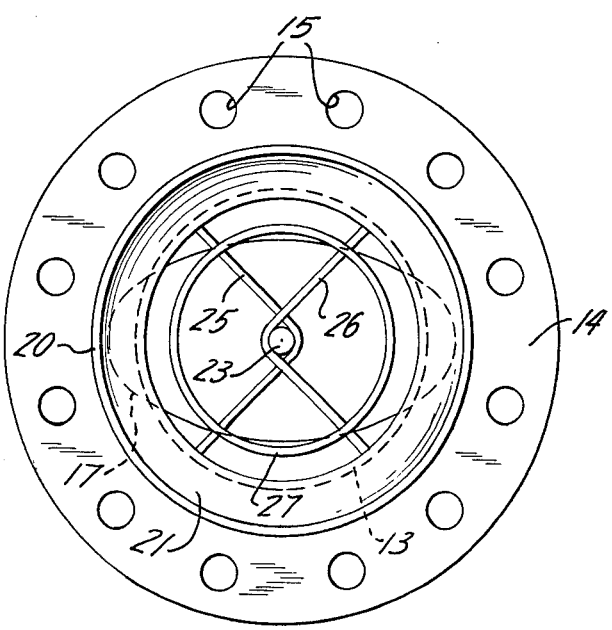

SAFETY FUELING VALVE

BACKGROUND OF THE INVENTION

1. Field of the Invention

This invention relates generally to fuel handling systems for high performance motor vehicles, such as racing cars, speed boats, aircraft and the like, and more particularly to a safety fueling valve which provides both safety and speed for the fueling operations of such vehicles and prevents spillage of fuel during accidents.

2. Description of the Prior Art

At the present time, so-called "high performance" vehicles are in great public demand. These vehicles, which may include racing cars, sports cars, go carts, dune buggies, speed boats and aircraft of various kinds, for example, are all designed for optimum performance such as acceleration and speed. Because of the high performance required, the equipment for these vehicles is usually specially designed to exacting performance and safety standard. For example, in racing cars, the fueling system for the car is subject to certain speed and safety requirements. When the car is in a race, refueling of the vehicle must be carried out at maximum speed and the time spent in "pit stops" must be reduced as much as possible. This means that the fuel from the pump, pressure nozzle, or gas can used to refuel the vehicle must enter the fuel tank on the vehicle at a maximum rate. For safety reasons, when the car is being refueled at a pit stop, it is quite important that back pressure and turbulence do not cause any of the fuel to spill or be ejected during the filling operation, to thereby prevent fires and explosions.

Because of the use to which racing cars and other high performance vehicles are put, crashes and other accidents must be anticipated and the fuel handling system of the vehicle must be designed to minimize the possibility of fires and explosions. When the vehicle is involved in a crash, it often is turned on its side or is turned completely over. In this event, it is quite important that the fuel in the vehicle tank be prevented from escaping since the spilled fuel could easily be ignited by a hot engine part or the hot exhaust system. Accordingly, a satisfactory fuel system for such vehicles should provide means for preventing escape of the fuel in the tank regardless of crash impact or attitude of the vehicle. The device used to accomplish this should be mechanically rugged and reliable in operation to prevent its being disabled during the crash. Additionally, the fuel handling systems for such high performance vehicles are also subject to the usual requirements of long life, low maintenance and ease of installation and manufacture. The fuel handling system of these vehicles should also be compatible with the wide range of filling apparatus in use today.

SUMMARY OF THE INVENTION

It is an object of this invention to provide a safety fueling valve for high performance vehicles and the like which provides fast fueling with no spillage of fuel.

It is a further object of this invention to provide a safety fueling valve which prevents leakage and back flow of fuel through the valve regardless of vehicle attitude.

It is a still further object of this invention to provide a safety fueling valve which is mechanically rugged and crash-resistant and which offers a long, virtually maintenance-free life.

It is another object of this invention to provide a safety fueling valve which is compatible in operation with the wide range of filling apparatus in use today, such as service station pumps, pressure nozzles, overhead tanks, dry break couplers, dump cans, buckets and funnels for example.

It is an additional object of this invention to provide a safety fueling valve which contains only one moving part and which is relatively inexpensive to manufacture, install and maintain.

It is still another object of this invention to provide a safety fueling valve which is light in weight and which may be employed with pressurized refueling equipment.

Briefly, the safety fueling valve of the invention comprises a valve body having a passageway therethrough and a valve seat surrounding the passageway at one of the ends thereof. Means are provided for mounting the valve body on a vehicle fuel tank with the passageway extending through the walls of the tank and said one end of the valve body disposed in the interior of the tank. A valve member of flexible, resilient material is adapted to engage the valve seat to seal the passageway and means for supporting the valve member with the member engaging the valve seat are mounted on the valve body, so that fuel flowing into the valve body from the other end thereof forces the valve member out of engagement with the valve seat to permit fuel to enter the tank and fuel flowing into the valve body from the tank forces the valve member to engage the valve seat to prevent fuel from escaping from the tank. Protective means surrounding the valve member and valve seat are provided to prevent debris in the interior of the tank from interfering with valve operation. A vane assembly in the passageway serves to channel fuel flow and prevent turbulence.

In one embodiment of the invention, the end of the valve body disposed in the tank is flared to form a larger diameter sleeve section connected to the remainder of the valve body by a shoulder which forms the valve seat. The sleeve section then functions as the protective means for the valve member and valve seat since the valve member and seat are disposed within the sleeve section. An alternative embodiment of the invention is disclosed wherein said one end of the valve body functions as the valve seat. In this arrangement, the protective means comprises a separate cylindrical sleeve which is mounted on the mounting means for the valve body and is disposed about the valve body. The sleeve has a length longer than the length of the valve body so that both the valve seat and valve member are protected.

The nature of the invention and other objects and additional advantages thereof will be more readily understood by those skilled in the art after consideration of the following detailed description taken in conjunction with the accompanying drawings.

BRIEF DESCRIPTION OF THE DRAWINGS

In the drawings:

FIG. 1 is a perspective view of a safety fueling valve constructed in accordance with the teachings of the present invention showing the valve mounted on a vehicle fuel tank with a portion of the tank being broken away to reveal details of construction of the valve;

FIG. 2 is a top plan view of the fueling valve shown in FIG. 1 of the drawings;

FIG. 3 is a full sectional view of the fueling valve taken along the line 3—3 of FIG. 2 of the drawings;

FIG. 4 is a bottom plan view of the fueling valve of FIGS. 1–3 of the drawings with the valve member and mounting nut removed to reveal details of construction.

DESCRIPTION OF THE PREFERRED EMBODIMENT OF THE INVENTION

Figure 5:
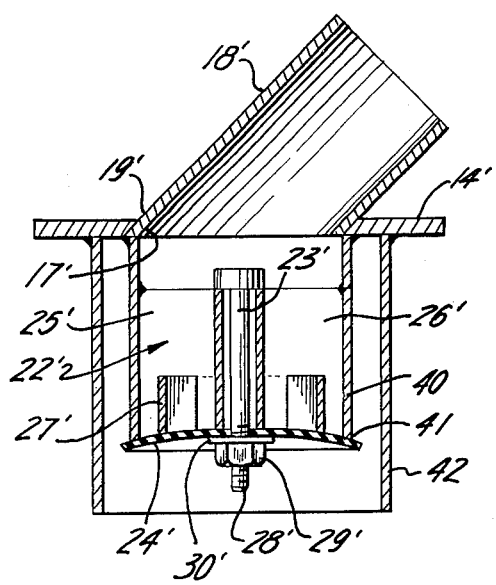
FIG. 5 is a full sectional view of a safety fueling valve constituting an alternative embodiment of the invention.

Referring now to FIG. 1 of the drawings, there is shown a safety fueling valve constructed in accordance with the teachings of the present invention. The fueling valve 10 is shown mounted on the top surface 11 of a fuel "bladder" or tank 12. The fueling valve 10 functions to admit gasoline or other fuel to the interior of the tank 12 where it is stored for use by the engine of the vehicle in which the tank is mounted. In order to permit the tank to be filled at a maximum rate, a "breather" air outlet (not shown) is usually provided for the tank, so that the air displaced by the fuel in the tank during the filling operation may be vented to the atmosphere. The breather vent may be provided with a movable ball valve or other type of check valve, so that the fuel will not escape when the tank is tilted or inverted, as, for example, when the vehicle is overturned during an accident. The fuel bladder or tank 12 is often formed with a partially flexible "skin" of a plastic material and is filled with a safety " foam" plastic, so that the fuel tank will deform rather than break or rupture during a severe crash impact to prevent the highly flammable fuel from escaping.

As seen in FIGS. 1 and 3 of the drawings, the fueling valve 10 comprises a first cylindrical valve body portion 13 which is secured by means such as welding, for example, to a circular mounting flange 14. The mounting flange 14 is provided with a plurality of radially-disposed apertures 15, so that the flange may be secured to the upper surface 11 of the fuel tank 12 by mounting bolts 16. Both the valve body portion 13 and the mounting flange 14 may be formed of a strong, light-weight material such as aluminum, for example, which does not react with the fuel being stored in the tank. The mounting flange 14 has a centrally-disposed elliptical opening 17 which receives a second cylindrical valve body portion or inlet tube 18. The inlet tube 18, which may also be formed of aluminum, for example, is truncated at end 19 thereof, so that the opening to the tube at end 19 is elliptical rather than circular in shape. The inlet tube 18 acts as a filler neck to receive the fueling nozzle from the pump or can and is secured to the mounting flange 14 by means, such as welding, for example, so that a rigid unitary structure is produced. The longitudinal axis of the inlet tube 18 is inclined at an obtuse angle with respect to the longitudinal axis of the valve body portion 13 for reasons which will be explained hereinafter. The cylindrical valve body portion 13 is secured to the flange 14 so that the cylindrical passageway in the valve body surrounds the elliptical opening 17 in the mounting flange 14.

The lower end 20 of the cylindrical valve body portion 13 is flared to form a larger diameter sleeve section or skirt which is connected to the body portion 13 by an annular shoulder 21 which serves as the valve seat for the valve member. A vane assembly, indicated generally as 22, is disposed in the cylindrical valve body 13 and provides a mounting means for a valve member support bolt 23 which supports a circular valve member 24 of flexible, resilient material. As seen in FIGS. 3 and 4 of the drawings, the vane assembly 22 is formed by two plates 25 and 26 which are bent at substantially right angles about the support bolt 23. The plates 25 and 26 may be formed of aluminum, for example, and may be secured to the support bolt 23 and the inner surface of the cylindrical valve body portion 13 by means such as welding, for example, to provide a stable mounting for the bolt 23, so that the bolt is centrally disposed within the cylindrical section formed by the flared end 20 of the valve body. Each of the four vanes or arms which are formed by the plates 25 and 26 is slotted at the lower end thereof to receive a cylindrical baffle or vane member 27. The cylindrical baffle 27 may also be fabricated of aluminum and is welded to the plates 25 and 26 to provide a unitary vane assembly. The valve member 24 is substantially circular in shape and is provided with a centrally-disposed aperture through which the support bolt 23 passes. The support bolt 23 is threaded at the lower end 28 thereof to receive a nut 29 and a washer 30 which prevent movement of the valve member along the bolt and hold the peripheral portion of the valve member in position against the valve seat 21. In practice, the valve member 24 should be formed of a flexible, resilient material which does not chemically react with the fuel utilized in the fuel tank. For example, the valve member 24 may be fabricated of polyurethane or rubber when the fuel being stored is gasoline. It may be noted from an inspection of FIG. 3 of the drawings that the four vanes formed by the plates 25 and 26 are curved with respect to the horizontal, so that when the valve member 24 is held in place by the nut 29 and washer 30, the valve member assumes a concavo-convex curvature which insures that the outer or peripheral portion of the valve member fully engages the annular valve seat 21 formed by the flared end 20 of the valve body. By virtue of this arrangement, the valve member 24 is held firmly against the valve seat 21, so that a tight seal is formed when the fuel in the tank seeks to escape from the tank because of a back pressure build up or when the vehicle is tilted or overturned. Under these conditions, the contoured lower ends of the vane members 25, 26 and 27 which form the vane assembly 22 provide the additional support required to prevent buckling of the flexible valve member 24.

In operation, when the fuel delivery nozzle is inserted into the valve body portion 18 of the fueling valve, the liquid fuel passes through the vane assembly 22 and forces the valve member 24 downwardly away from contact with the valve seat 21, so that relatively little resistance is provided to inward fuel flow. When the vehicle is overturned, however, or if an undesirable back pressure builds up within the fuel tank, the valve member 24 is forced into an even tighter engagement with the valve seat 21 thereby effectively preventing the fuel from escaping from the tank. It may be noted that the arrangement of the inlet tube 18 and valve body portion 13 provides a means of increasing the cross-sectional area of the fuel flow path to compensate for any flow restriction caused by the valve member 24 and the vane assembly 22. To this end, the diameter of the valve body portion 13 is made larger than the diameter of the valve body portion 18. It will also be seen that the longitudinal axis of the tube 18 is at an obtuse angle with respect to the longitudinal axis of the valve body portion 13 so that a smoothe transition is provided from the smaller cross-sectional area of the inlet tube 18 to the larger cross-sectional area of the valve body portion 13. By suitably proportioning the angle of inclination and the diameters of the inlet tube 18 and the valve body portion 13, an increase in cross-sectional area of approximately 75% may be obtained. Since this increase in cross-sectional area compensates for any fuel flow restriction caused by the valve action, it effectively prevents any back flow or spillage of fuel caused by a high speed filling operation, such as may be encountered in a racing pit stop, for example.

The internal vane assembly 22 "channels" the fuel flow through the valve and effectively minimizes turbulence which would otherwise reduce the filling rate. The vane assembly 22 also functions to stiffen the cylindrical valve body portion 13 to enable it to resist the forces encountered in severe crashes and other impacts. The same vane assembly also provides the aforementioned concentric support for the valve member 24 to prevent buckling during internal pressure build-up within the tank and establishes a proper concavo-convex contour for the valve member to provide effective sealing action. Since the elongated valve body portion 13 suspends the area in which the valve action takes place several inches below the top surface 11 of the fuel tank 12, the fueling valve of the invention continues to operate during crashes even through the inlet tube 18 and mounting flange 14 may be severely mangled or distorted. The sleeve section or skirt 20 at the end of the valve body 13 not only provides the seat for the valve member 24 but also serves the protective function of preventing any foam baffling within the fuel tank from lodging between the valve member 24 and the seat 21 during crashes, so that the valve action is made mechanically rugged. It may also be noted that since the sealing action takes place in the circular area of contact between the periphery of the circular valve member 24 and the annular seat 21, a smooth fuel flow pattern is provided which minimizes turbulence and air entrapment thereby increasing the allowable flow rate for the fuel to permit fast refueling. Finally, the flared end 20 of the valve body 13 also serves to prevent the walls of the fuel tank 12 from completely collapsing during crashes and acts as a stiffening rib to add structural rigidity to the valve body 13.

An alternative embodiment of the safety fueling valve of the invention is shown in FIG. 5 of the drawings. In describing this embodiment of the invention, reference numerals with a prime notation will be employed to designate parts which are the same as or similar to the corresponding parts in the embodiment of FIGS. 1-4 of the drawings. As seen in FIG. 5, the flared valve body portion 13 is replaced by a cylindrical valve body 40. The end 41 of the valve body serves as the valve seat for the valve member 24'. The vane assembly 22' and the valve member support bolt 23' cooperate with the nut 29' and washer 30' to produce the desired concavo-convex curvature for the valve member to provide a good sealing action. Since the valve member 24' is curved, it will make a circular "line contact" seal with the end 41 of the valve body and produce a better seal in terms of seal pressure per unit area of seal as compared to the arrangement of FIGS. 1-4 of the drawings. In order to protect the valve member 24' and valve seat 41 from any loose debris in the fuel tank, such as the safety foam filling, for example, a separate cylindrical sleeve 42 is mounted on the flange 14' and concentrically disposed about the valve body portion 40. The lower end of the sleeve 42 may be arranged to extend about two inches below the valve body 40. Both the valve body 40 and the sleeve 42 may be fabricated of aluminum and secured by means such as welding, for example, to the mounting flange 14'.

From the foregoing description, it may be seen that the fueling valve of the invention permits vehicles to be refueled in the shortest possible time and provides safe refueling because spillage of fuel is virtually eliminated. Similarly, fuel is prevented from escaping from the tank regardless of the physical attitude which the vehicle assumes. For example, should the vehicle be tilted on one side or overturned, the fuel in the tank will be effectively prevented from escaping. The design of the system permits the safety fueling valve to be used with virtually all types of filling apparatus, such as the conventional gasoline service station pump, high pressure nozzles, overhead tanks, dry break coupling can, and bucket and funnel filling, for example. Accordingly, the valve may be installed in virtually any type of fuel system for any use and is also suitable for use with both gaseous and powdered fuels. The valve may also find application in many industrial process applications. Since the only moving part is the valve member 24, the life of the unit is extremely long and maintenance and repair are virtually eliminated. The valve of the invention is also suitable for use with pressurized fueling apparatus since any pressure produced in the fuel tank 12 during the fueling operation is effectively sealed within the tank when the high pressure nozzle is withdrawn.

It is believed apparent that many changes could be made in the construction and described uses of the foregoing safety fueling valve and many seemingly different embodiments of the invention could be constructed without departing from the scope thereof. For example, it is believed obvious that different configurations or shapes could be employed for the vane assembly, valve body and mounting flange. Accordingly, it is intended that all matter contained in the above description or shown in the accompanying drawings shall be interpreted as illustrative and not in a limiting sense.

What is claimed is:

1. A safety fueling valve for vehicle fuel systems and the like comprising a valve body having a passageway therethrough, said valve body having first and second substantially cylindrical valve body portions, said first valve body portion having a valve seat surrounding said passageway at one of the ends of the first valve body portion and being joined to said second valve body portion at the other end thereof, the said first valve body portion having a larger diameter than the second valve body portion and having the longitudinal axis thereof disposed at an obtuse angle with respect to the longitudinal axis of said second valve body portion to provide a smooth transition between said valve body portions of different diameter;

flange means on said first valve body portion at said one end thereof for mounting said valve body on a vehicle fuel tank with said passageway extending through the walls of the tank, said first valve body portion disposed in the interior of the tank, and said second valve body portion disposed exteriorly of the tank to provide a filler neck for receiving a fueling nozzle;

a valve member of flexible resilient material provided for engaging said valve seat to seal said passageway, said valve member having a centrally disposed aperture therein;

a vane assembly comprising a plurality of fluid-directing radially-extending intersecting vanes mounted in said passageway in said first valve body portion with the intersection of said vanes extending along the longitudinal axis of said passageway and one of the ends of each vane adjacent said one end of the first valve body portion to channel fuel flow through said passageway and prevent turbulence therein, each of said vanes comprising a thin substantially flat plate extending along said first valve body portion for a substantial part of the length of said first valve body portion, the said one end of each vane being curved to provide a concavo-convex curvature for the end of the vane assembly adjacent said one end of the first valve body portion;

a support rod mounted on said vane assembly along the intersection of said vanes and passing through the aperture in said valve member for supporting said valve member;

means mounted on said support rod to force said valve member into engagement with said valve seat and said one end of each of said vanes, so that fuel flowing into the valve body through said second valve body portion forces said valve member out of engagement with said valve seat to permit fuel to enter the tank and fuel flowing into said valve body from the tank forces said valve member to engage said valve seat and said one end of each of said vanes to prevent fuel from escaping from the tank; and protective means surrounding said valve member and said valve seat for preventing debris in the interior of the tank from interfering with valve operation.

2. A safety fueling valve as claimed in claim 1 wherein said first valve body portion is flared at said one end thereof to form a larger diameter sleeve section connected to said first valve body portion by an annular shoulder, said shoulder is said valve seat, said sleeve section is said protective means, and said valve member is a circular disc concentrically disposed within said sleeve section with the peripheral portion thereof engaging said annular valve seat.

3. A safety fueling valve as claimed in claim 1 wherein said one end of said first valve body portion is said valve seat, said valve member is a circular disc having a diameter larger than said one end of said first valve body portion, and said protective means comprises a substantially cylindrical sleeve mounted on said flange means and concentrically disposed about said first valve body portion, said sleeve having a length longer than said first valve body portion to protect said valve member and valve seat.

* * * * *